(12) United States Patent
Good et al.

(10) Patent No.: US 9,290,417 B2
(45) Date of Patent: Mar. 22, 2016

(54) COMPOSTER

(71) Applicant: Rotary Composters, LLC, Denver, PA (US)

(72) Inventors: Kenton Good, Lancaster, PA (US); Kurtis Good, East Earle, PA (US); Daniel Gonzalez, East Earle, PA (US)

(73) Assignee: Rotary Composters, LLC, Denver, PA (US)

( * ) Notice: Subject to any disclaimer, the term of this patent is extended or adjusted under 35 U.S.C. 154(b) by 123 days.

(21) Appl. No.: 14/454,798

(22) Filed: Aug. 8, 2014

(65) Prior Publication Data

US 2014/0349384 A1 Nov. 27, 2014

Related U.S. Application Data

(63) Continuation-in-part of application No. 13/418,000, filed on Mar. 12, 2012, now abandoned.

(60) Provisional application No. 61/454,671, filed on Mar. 21, 2011.

(51) Int. Cl.
*C05F 17/02* (2006.01)

(52) U.S. Cl.
CPC ......... *C05F 17/0223* (2013.01); *C05F 17/0229* (2013.01); *Y02P 20/145* (2015.11); *Y02W 30/43* (2015.05)

(58) Field of Classification Search
CPC ............. C05F 17/0223; C05F 17/0229; Y02P 20/145; Y02W 30/43
See application file for complete search history.

(56) References Cited

U.S. PATENT DOCUMENTS

| | | | |
|---|---|---|---|
| 3,915,064 A | 10/1975 | Dancs | |
| 3,930,799 A | 1/1976 | Eweson et al. | |
| 4,273,000 A | 6/1981 | Schmid | |
| 4,867,572 A | 9/1989 | Brock | |
| 5,103,687 A | 4/1992 | Farnham | |
| 5,244,804 A | 9/1993 | Horkan et al. | |
| 5,589,391 A | 12/1996 | Fink | |
| 5,953,958 A | 9/1999 | Young | |
| 6,001,641 A | 12/1999 | Posselius | |
| 6,555,363 B1 | 4/2003 | Roberts et al. | |
| 6,703,234 B1 | 3/2004 | Wadewitz | |
| 7,258,922 B2 | 8/2007 | Hesse et al. | |
| 7,472,877 B2 | 1/2009 | Hawkins et al. | |
| 7,745,208 B2 | 6/2010 | Noll | |
| 2006/0169857 A1 | 8/2006 | Hawkins | |
| 2007/0065937 A1 | 3/2007 | Rashwan | |
| 2010/0055775 A1 | 3/2010 | O'Kane | |

OTHER PUBLICATIONS

Harrison, Two-Stage, Single-Unit, and Energy-Efficient Granulator Dryer, U.S. Statutory Invention Registration H980, dated Nov. 5, 1991.

*Primary Examiner* — Jonathan Hurst
(74) *Attorney, Agent, or Firm* — Howson & Howson LLP

(57) ABSTRACT

In a composter having a horizontally elongated rotating drum, material is fed into the drum through an opening in a stationary end plate having an annular marginal area which overlaps, in sealing relationship, an annular intake end wall of the drum. Material passes through a central opening in an annular exit end wall of the drum, and falls by gravity onto a cylindrical screen which is fixed to, and rotates with, the exit end wall. The annular end walls are in axial register with, and surrounded by, external trunnions on the drum which ride on pairs of supporting rollers. Frusto-conical rings are welded to the end walls, and to the inside of the drum at locations opposite the edges of the trunnion rings to reduce metal fatigue. The exit end rollers allow for axial expansion of the drum. The interior wall the drum is lined with a rubber.

14 Claims, 4 Drawing Sheets

COMPOSTER

CROSS-REFERENCE TO RELATED APPLICATIONS

This application is a continuation-in-part of application Ser. No. 13/418,000, filed Mar. 12, 2012, and which claimed priority on the basis of Provisional Application Ser. No. 61/454,671, filed Mar. 21, 2011.

FIELD OF THE INVENTION

This invention relates to composting, and more particularly to a large-scale composting apparatus suitable for producing usable compost from plant and animal matter collected for example on a farm, at a meat packing plant, or at other facility where such materials accumulate.

BACKGROUND OF THE INVENTION

In raising livestock and in meat packing, it is frequently necessary to dispose of the bodies of animals that die prematurely due to various causes. U.S. Pat. No. 6,703,234, granted on Mar. 9, 2004, for example describes a method and apparatus for composting animal bodies in which odors and pathogens are controlled by recirculation of air and gaseous products of the composting process.

Compost produced from animal carcasses, animal waste, vegetation, garbage, and other materials can be utilized as fertilizer. It is known to use a rotatable digesting drum in which material is introduced, mixed by rotation, and converted into usable fertilizer. In some cases, the composting operation is carried out as a batch process. In others, material is processed in the rotating drum continuously.

One of the problems encountered in continuous composting using a rotating drum is that of introducing material into the drum. Suitable automatic conveyors are expensive, and it is difficult to ensure reliable operation. On the other hand, manual introduction of material is both labor-intensive and unpleasant, and introduction of materials into a rotatable composter using machinery such as a front end loader is difficult especially because of the problem of avoiding spillage.

Another problem is that some materials, such as animal bones and some vegetable matter, will take longer to digest, and must be separated from the composted material in order to deliver a usable product.

Some composting applications can cause corrosion and premature deterioration of conventional composting equipment, necessitating frequent maintenance, and also early replacement of the rotating drum, which is the main component of the composter. Another problem is that composting material tends to slip on the side wall of a rotating drum, resulting in failure of composting media to turn over as desired. Another problem is that some compositing materials adhere to the wall of the rotating drum, resulting in non-uniform transit of material through the drum in a continuous composting operation.

Another problem with a large composter, which can have a length of twelve or more meters and a diameter of three or more meters, is in configuring the composter drum so that it has adequate strength to sustain the weight of its contents without excessively increasing the weight of the drum itself. Still another problem is metal fatigue due to stresses resulting from the weight of the composter drum and its contents.

SUMMARY OF THE INVENTION

A composter according to the invention comprises an elongated cylindrical metal drum, typically twelve or more meters in length and three or more meters in diameter. The cylindrical wall of the drum is symmetrical about a horizontal axis, and the drum is slowly rotated about the axis by a drive which can bean indexing mechanism comprising a reciprocating pawl which cooperates with a set of ratchet teeth on the exterior of the drum, rotating the drum through several degrees of angle periodically. Material to be composted is fed into a hopper at an intake end of the drum, and converted within the drum into usable compost, which is delivered through an exit at the opposite end. A blower at the inlet end transfers air into the drum. Material moves axially through the drum as the drum rotates. Axial movement of the material takes place because the material tends to level as the drum rotates. Thus, as material is introduced at the inlet end, the level of the material in the drum rises, and a corresponding amount of material moves through the exit end.

One of the characteristic features of a preferred composter according to the invention is the construction of its intake end. The material feed hopper is affixed to a stationary, preferably circular, plate having its center on the axis of rotation of the drum and located inside the drum a short distance from the intake end of the drum. A ring-shaped plate attached to the inner cylindrical surface of the drum cooperates with the circular plate to seal the intake end of the drum, thereby preventing composting material from falling out of the drum at the intake end. The material feed hopper is arranged to deliver material through an opening in the circular plate, the opening being located approximately centrally in the circular plate.

More particularly, in accordance with this first aspect of the invention, the composter comprises an elongated hollow drum having a substantially cylindrical wall symmetrical about a substantially horizontal axis and having an interior space. The drum is mounted for rotation on the substantially horizontal axis, and has axially spaced intake and exit ends. An annular intake end wall is fixed to the cylindrical wall and extends inward toward the drum axis from a location on the cylindrical wall adjacent to the inlet end of the drum. The intake end wall is rotatable with the drum and has a central opening. An annular exit end wall is fixed to the cylindrical wall and extends inward toward the drum axis from a location on the cylindrical wall adjacent to the exit end of the drum. This exit end wall is also rotatable with the drum. The end wall has a central exit opening for delivery of material from the interior space of the drum.

The composter also has a stationary end plate with an annular marginal area all of which overlaps a part of the intake end wall. The stationary end plate has a material feed opening in register with the central opening of the intake end wall. A feed hopper is fixed to the stationary end plate on the side thereof faced by the outer surface of the end plate, and includes a chute arranged to deliver material collected in the hopper through the material feed opening into the interior space of the drum. A drive mechanism is provided for rotating the drum about its axis.

A seal is provided between said annular marginal area of the stationary end plate and the part of the intake end wall overlapped by said marginal area. Preferably, the annular marginal area of the stationary end plate is located on the side of the annular intake end wall facing the interior space of the drum, and the seal is provided by a layer of grease in contact with both the annular marginal area of the stationary end plate and the part of the intake end wall overlapped by the marginal area of the end plate.

Another characteristic feature of the preferred composter is a rotating sifting screen located at the exit end of the drum. The sifting screen is a generally cylindrical screen having openings of a suitable size to pass compost useful as fertilizer. The screen is affixed to an end plate that rotates with the drum. A cylindrical channel also affixed to the rotating end plate extends part-way into the cylindrical screen. The channel is coaxial with the drum and receives composted material through a central opening in the end plate. The diameter of the cylindrical screen is greater than that of the cylindrical channel, and consequently, material exiting the cylindrical channel drops by gravity onto the screen, and matter sufficiently fine to pass through the screen can be collected on a conveyor or in a suitable receptacle in which it can be hauled away from the composter for use. Coarse materials such as bones and undigested vegetable matter, which do not pass through the openings of the screen, move axially through the screen are delivered through an open end of the screen, from which they can be collected separately from the fine compost.

More particularly, a cylindrical screen is connected to and rotates with the exit end wall. This screen is coaxial with the central exit opening in the exit end wall, and has a diameter larger than the diameter of the central exit opening. The screen is being positioned to receive material delivered from the interior of the drum through the central exit opening, and has an end opening remote from the central exit opening, the end opening having a diameter substantially equal to the inner diameter of the cylindrical screen.

The drum is preferably mounted for rotation on two sets of supporting rollers, one set being adjacent to the intake end of the drum and the other set being adjacent to the exit end. External ring-shaped trunnions on the drum ride on the rollers. The axial length of the rollers at the exit end is greater than the width of the trunnion that engages them in order to allow for the axial expansion of the drum due to heat generated in the exothermic composting process.

More particularly, in accordance with this aspect of the invention, the cylindrical wall of the drum has a first external trunnion adjacent to its intake end and a second external trunnion adjacent to its exit end, and the composter includes first and second pairs of idler rollers rotatably supporting the drum. The first pair of rollers is in rolling engagement with the first external trunnion ring, and the second pair of rollers is in rolling engagement with the second external trunnion ring. The first external trunnion ring is restrained against axial movement, and the second trunnion ring is axially movable relative to the second pair of rollers, thereby allowing for axial expansion and contraction of the drum.

Still another characteristic feature of the preferred composter is the positioning of the annular intake end wall or the annular exit end wall above a pairs of rollers on which the drum is supported. More particularly, in accordance with this aspect of the invention, at least one of said annular end walls meets the cylindrical wall of the drum at a location in axial register with one of the external trunnion rings so that the end wall is surrounded by the external trunnion ring. Preferably, the annular intake end wall meets the cylindrical wall of the drum at a location in axial register with the first external trunnion ring, and the annular exit end wall meets the cylindrical wall of the drum at a location in axial register with the second external trunnion ring. In these positions, the annular end walls reinforce the drum, and thereby make it possible to reduce the overall weight of the drum.

According to still another aspect of the invention, to prevent metal fatigue from causing premature failure of the drum, at least one of the end walls of the composter drum is reinforced by first and second frusto-conical ring. The first frusto-conical ring has large and small circular edges. The large circular edge meets the internal surface of the cylindrical wall of the drum at a location on one side of the end wall, preferably opposite a first edge of a first trunnion ring, and the small circular edge of the first frusto-conical ring meets the end wall at a location spaced radially inward toward the axis of rotation of the drum from the internal surface of the cylindrical wall of the drum. The large circular edge of a similar second frusto-conical ring similarly meets the internal surface of the cylindrical wall of the drum at a location on the opposite side of the end wall, and preferably opposite the second edge of the first trunnion ring, and the small circular edge of the second frusto-conical ring meets the end wall at a location spaced radially inward toward the axis of rotation of the drum from the internal surface of the cylindrical wall of the drum.

In this case, the end wall should, but does not necessarily need to, meet the internal wall of the drum. Where the end wall meets the inner surface of the cylindrical wall of the drum, the first and second frusto-conical rings cooperate with the end wall and the cylindrical wall of the drum to form two closed annular chambers on opposite sides of the end wall. Each of the first and second frusto-conical rings is provided with a through hole for delivery of corrosion-inhibiting fluid to one of the annular chambers, and each through hole is closed by a removable plug.

Still another characteristic feature of the preferred composter is a rubber lining covering the cylindrical inner wall of the drum. More particularly, the cylindrical wall of the drum has an inner surface coating composed of a rubber. The rubber lining, which is preferably sprayed-on, resists corrosion of the drum and also reduces adhesion of composting matter to the wall of the drum, thereby improving the uniformity of the residence time of the material in the drum.

Further features, objects, and advantages of the invention will be apparent from the following description when read in conjunction with the drawings.

DETAILED DESCRIPTION OF THE PREFERRED EMBODIMENTS

Figure 1:
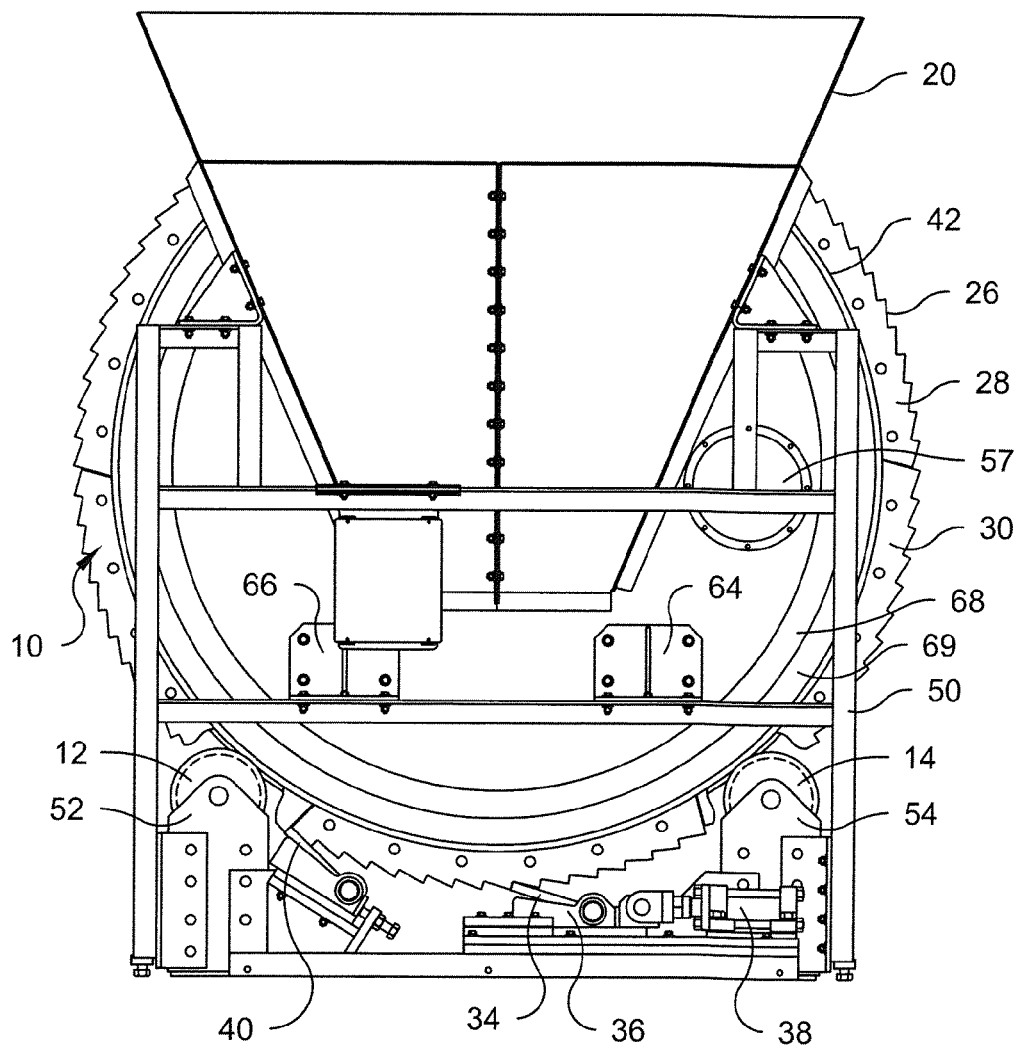
FIG. 1 is an elevational view of the intake end of the composter, showing the feed hopper and the indexing mechanism.

As shown in the figures, the composter according to the invention includes as its main component a horizontally elongated cylindrical drum 10 mounted for rotation on a set of four rollers 12, 14, 16 and 18, on a substantially horizontal axis. A hopper 20 is provided at the intake end of the drum for the introduction of material to be composted into the drum. At the exit end, a short tubular extension 22 is provided for delivery of compost onto a cylindrical wire screen 24 which surrounds the tube.

The length of the drum is typically twelve or more meters and its diameter is typically 1.5 meters or more.

The composter is rotated at a slow rate, typically 2-3 revolutions per hour in steps of 3-10 degrees. The residence time for material in the composter, which is dependent primarily on the length of the drum and on the rate of introduction of material, is typically about 2-5 weeks.

As shown in FIG. 1, the exterior of the drum is provided with a circular set of ratchet teeth 26 formed on arc-shaped segments, including segments 28 and 30, which are bolted to a flange 32 (FIG. 2) formed on or adjacent to the entry end of the drum.

The teeth are engaged by a pivoted pawl 34 on a sliding carriage 36. The pawl is urged against the ratchet teeth by a spring (not shown), and the carriage 36 is reciprocated in a direction tangent to the circle of ratchet teeth by the piston of a hydraulic cylinder 38 operated by hydraulic fluid supplied by a timer-operated pump-valve combination (not shown). A stationary spring-loaded pawl 40 is provided to prevent reverse rotation of the drum due to the unbalanced condition of the material inside the drum as the material accumulates on the left side of the interior of the drum (in FIG. 1) due to clockwise rotation.

Figure 2:
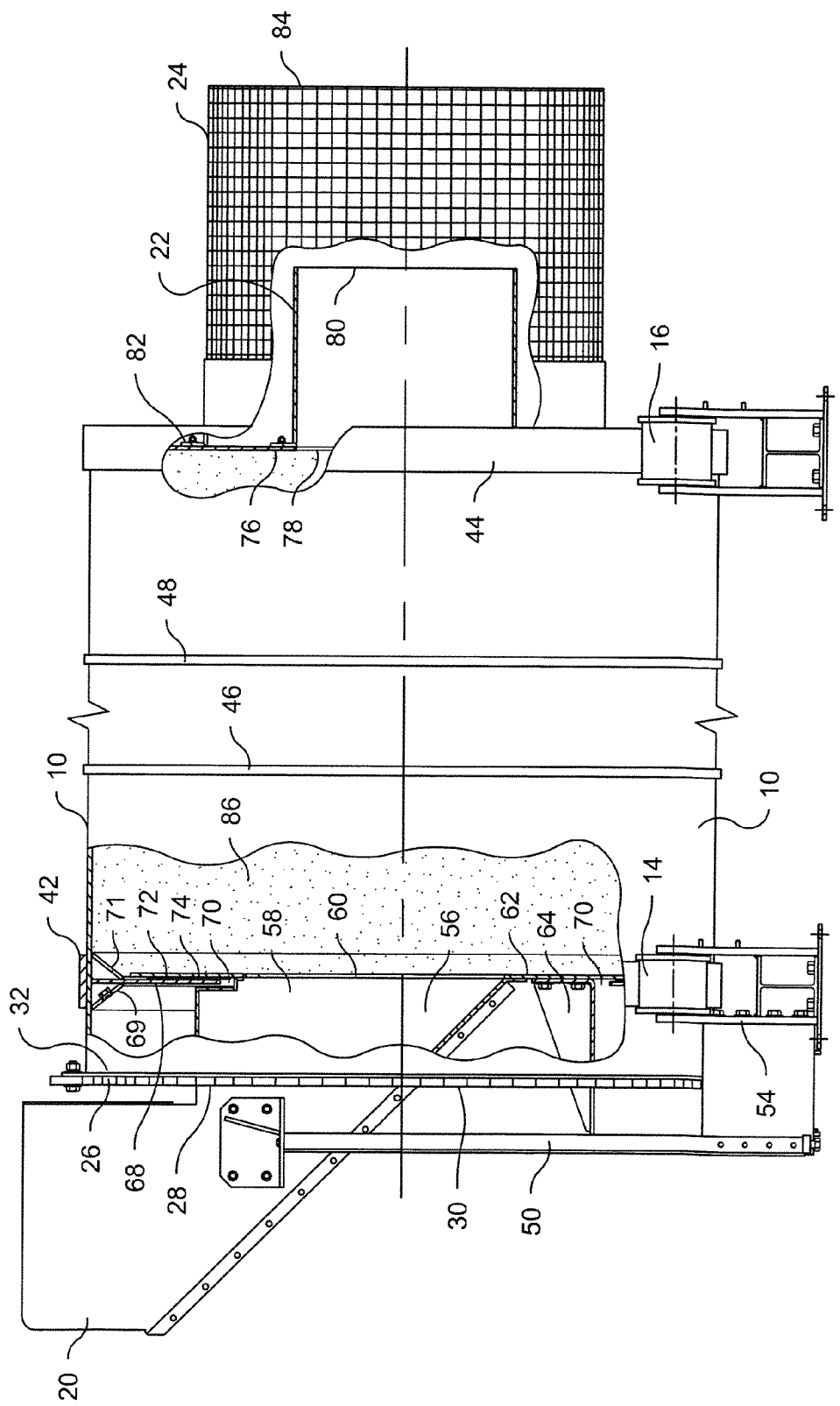
FIG. 2 is a shortened side elevational view of the composter.

As shown in FIG. 2, trunnion rings 42 and 44 formed on the drums, adjacent to the intake and exit ends respectively, engage the supporting rollers, trunnion ring 42 being engaged with rollers 12 and 14, and trunnion ring 44 being engaged with rollers 16 and 18. Flanges on rollers 12 and 14 are spaced by a distance substantially equal to the axial width of trunnion ring 42 and keep the intake end portion of the drum from moving axially. Flanges on rollers 16 and 18, however, are spaced from each other by a distance greater than the axial width of trunnion ring 44, as shown in FIG. 2, to allow for axial expansion and contraction of the drum resulting from temperature changes, which can range from ambient temperatures to considerably higher temperatures resulting from heat generated within the drum in the composting process. The temperature can range from below 0° C., depending on the climate of the region in which the composter is used, to above 70° C. The drum-supporting rollers 16 and 18 should be positioned so that their flanges are spaced from trunnion ring 44 in both axial directions at a suitable intermediate temperature, e.g., 35° C.

The drum can be reinforced not only by the roller-engaging trunnion rings 42 and 44, but by additional reinforcing rings, such as rings 46 and 48, provided on the exterior of the drum.

As shown in FIGS. 1 and 2, the feed hopper 20 is supported on a stationary frame 50, which is fixed to roller supports 52 and 54, on which rollers 12 and 14 are mounted respectively. The feed hopper has a chute 56, having a delivery opening 58 inside the drum. The chute 56 has an end opening in register with an opening 60 in a stationary end plate 62, which is also supported on stationary frame 50 by brackets 64 and 66 as well as by welds connecting the end plate to flanges on the end of chute 56. A blower 57 is provided on end plate for introducing air into the interior of the drum.

An annular intake end wall 68 is fixed, by welding, to the inside of the cylindrical wall of the drum so that it rotates with the drum. The intake end wall extends inwardly from the inner wall of the drum and has a central opening 70. The end wall 68 is overlapped by an annular marginal area 72 of the stationary end plate 62, which is preferably located adjacent to the side of the wall 68 that faces the exit end of the drum. A layer 74 of grease between the annular marginal area of the stationary end plate 62 and the overlapped part of the end wall 68 provides a seal that prevents the escape of composting matter through the intake end of the drum. The overlapping parts of the rotating intake end wall and the stationary end plate, and the layer of grease form a continuous annular seal surrounding the opening 60, through which matter to be composted enters the interior of the drum from the hopper. Preferably the bottom of the opening 60 is located a short distance below a level midway between the top and bottom of the cylindrical inner wall of drum 10. The annular intake end wall 68 is preferably axially in register with trunnion ring 42, i.e., it meets the inner wall of the drum at a location surrounded by trunnion ring 42. Because the wall 68 is in register with the trunnion ring 42, it reinforces the trunnion ring, making the trunnion ring better able to sustain the forces applied to it by the supporting rollers 12 and 14.

Figure 4:
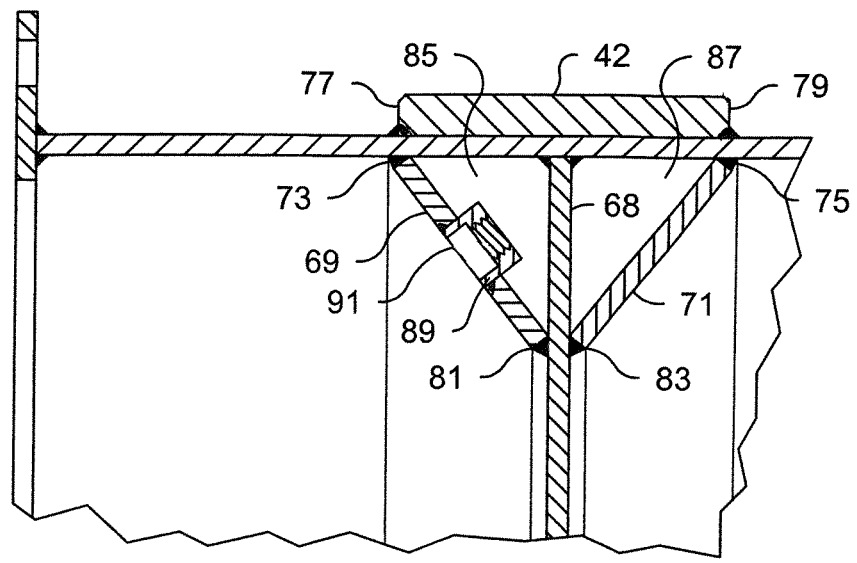
FIG. 4 is a cross-sectional view showing first and second frusto-conical reinforcing rings cooperating with an intake end wall and a first external trunnion ring.

To avoid failure of the drum at the location of the intake end wall due to the effects of metal fatigue, frusto-conical rings 69 and 71 are welded on both sides of the intake end wall as shown in FIG. 2, and in greater detail in FIG. 4. Each of these rings is formed by cutting a set of arc-shaped elements from a steel plate, bending them so each one is in the form of an sector of a conical frustum having an outer surface defined between two circular arcs, a larger one of which conforms to the inner wall of the drum and the smaller one of which conforms to the face of end wall 68. Typically, the conical frustum can be made from four such arc-shaped elements. The four elements are welded to one another end-to-end to form a complete frusto-conical ring, which is also welded to the cylindrical inner wall of the drum and a face of end wall 68 as shown in FIG. 4. The welds 73 and 75, that attach the frusto-conical elements 69 and 71 to the inner wall of the drum, are spaced from each other axially, i.e., in the direction of the axis of rotation of the drum, and located on opposite sides of the end wall 68. To achieve optimum resistance to metal fatigue, welds 73 and 75 should be located so that they are both surrounded by the external trunnion ring 42. Preferably, welds 73 and 75 are located respectively opposite circular edges 77 and 79 of the trunnion ring 42. The welds 81 and 83, that attach the frusto-conical elements to the end wall 68, are located radially inward from the cylindrical inner wall of the drum so that the generators of the conical rings form angles of about 50° with the axis of rotation of the drum. The frusto-conical rings cooperate with the end wall 68, and the external trunnion ring 42, to reinforce the drum, preventing continuous relative motion of the inner wall and the drum that can result in failure due to metal fatigue.

As shown in FIG. 4, the frusto-conical rings, the cylindrical wall of the drum and the intake end wall 68 cooperate to form closed annular chambers 85 and 87 on opposite sides of end wall 68. A fitting 89 in element 69, which is closed by a removable plug 91, provides access to chamber 84 for introduction of corrosion-inhibiting fluid, e.g., a biodegradable hydraulic oil. A similar fitting and plug can be provided in one or more of the other elements of the ring of which element 69 is a part and, also in one or more of the elements of the ring of which element 71 is a part. Alternatively, one or more openings can be provided in wall 68 for flow of corrosion-inhibiting fluid from one of the two annular chambers to the other, in which case the fitting and plug is only needed in one of the frusto-conical rings.

Figure 5:
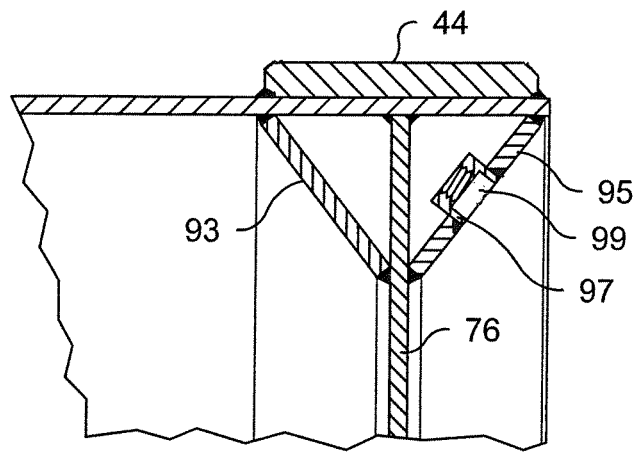
FIG. 5 is a cross-sectional view showing third and fourth frusto-conical reinforcing rings cooperating with an exit end wall and a second external trunnion ring.

At the exit end of the drum, an annular exit end wall 76 (FIG. 3), having a central opening 78, is similarly in axial register with trunnion ring 44, and provides reinforcement to the trunnion ring. As shown in FIG. 5, frusto-conical rings 93 and 95 are provided on opposite sides of exit end wall 76 with the welds at their outer ends spaced axially from each other, on opposite sides of the exit end wall 76, preferably surrounded by trunnion ring 44, and preferably opposite the edges of trunnion ring 44 for the same purpose as the frusto-conical rings on opposite sides of the intake end wall 68. A fitting 97 and plug 99 are provided for introduction of corrosion-inhibiting fluid.

Stresses at the locations of the trunnion rings also tend to cause the roller-engaging outer surfaces of the trunnion rings to bend and depart from a circular cylindrical shape. To resist such bending, it is desirable to take measures to create a stress flow path from the outer edges of the trunnion ring, through the frusto-conical rings, to the end walls. To this end, as shown in FIGS. 4 and 5, fillets are formed on the edges of the roller-engaging surfaces of the trunnion rings, and the trunnion rings are beveled where they are welded to the outside of the drum so that the bevels face the outer surface of the drum and parts of the welds are situated between the outer surface of the drum and the beveled parts of the trunnion ring. These welds are preferably directly opposite the welds that connect the frusto-conical rings to the interior surface of the drum.

Figure 3:
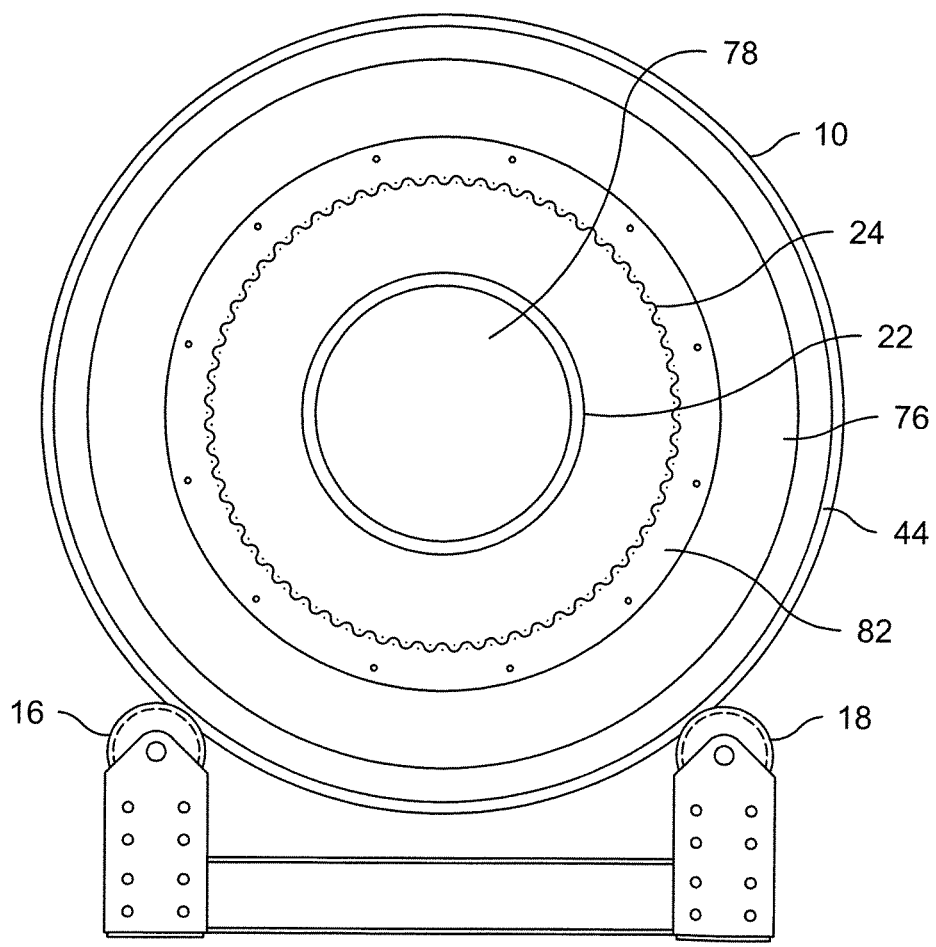
FIG. 3 is an elevational view of the exit end of the composter.

As shown in FIGS. 2 and 3, the tubular extension 22 extends from wall 76 and rotates with wall 76. The extension is coaxial with the central opening 78 of wall 76 and the inner diameter of extension 22 is approximately equal to the diameter of opening 78 and the bottom of opening 78 is preferably approximately at the same level as the bottom of the hopper delivery opening 58. A delivery end 80 of the extension 22 is located within the cylindrical wire screen 24, which is affixed to wall 76 by a flange 82.

The wire screen is coaxial with extension 22 and has a diameter approximately twice that of the extension. As the drum rotates, matter introduced through the hopper at the intake end travels through the drum slowly while being converted into compost. Composted matter delivered through extension 22 falls onto the interior of the screen 24 and matter fine enough to pass through the screen can be collected in a receptacle or by a conveyor located below the screen. Coarse undigested matter will continue to move axially within the screen and can be collected separately by another receptacle or conveyor below the exit end 84 of the screen.

As shown in FIG. 2, the part of the cylindrical interior wall of the drum that is exposed to contact with composting matter is coated with a sprayed-on rubber lining 86. The sprayed-on rubber lining resists corrosion of the drum and also increases friction on the inner surface of the drum, which prevents slippage of the compost media, thereby ensuring that the material is tumbled as the drum rotates. By imparting a uniform frictional property to the inner surface of the drum, the rubber lining also prevents adhesion of some composting matter to the wall of the drum, thereby improving the uniformity of the residence time of the material in the drum. Finally, the rubber coating also insulates the drum, reducing loss of heat so that composting can take place more efficiently.

Advantages of the composter according to various aspects of the invention include the following. The composter can allow an operator to introduce new material at any desired time, and at any desired rate within a wide range, all while the composter is in continuous operation. Material delivered through the exit end of the composter can be dropped onto the interior of a cylindrical screen which rotates with the drum. The screen, which has an open end, automatically separates large undigested material from usable compost, delivering the compost through screen openings and delivering the larger materials through the open end. By positioning the annular intake and exit end walls in axial register with the external trunnion rings on the drum, the end walls can serve as reinforcements, making it possible to reduce the weight of the drum. The rubber lining reduces corrosion and improves uniformity of residence time. The relationship between the supporting rollers and the trunnion rings can allow for thermal expansion and contraction of the composter drum while ensuring that the sealing relationship between the intake end wall and the stationary end plate is maintained. In addition, the frusto-conical rings inhibit relative motion of the end walls and the cylindrical wall of the drum and thereby protect the apparatus against failure due to metal fatigue. Corrosion of the chambers formed by the frusto-conical rings is avoided by introducing corrosion-inhibiting fluid through fittings provided in one or more of the ring elements.

Various modifications can be made to the composter described. For example, the ratchet teeth by which the drum is driven can be formed on a continuous ring instead of on segments, and the ring, can be secured to a flange on the drum or fastened directly to the end of the drum by suitable means such as welding. Alternatively, individual ratchet teeth can be secured, by welding or other suitable means, to a flange or to an end of the drum While an indexing drive is preferred, a continuously operating electric motor with a speed-reducing gear train can be used. Various different kinds of conveying devices can be used both to feed material to the intake end of the composter and to remove compost and waste from the exit end. While the axis of the drum is preferably horizontal, minor departures from horizontal rotation can be made without materially affecting the operation of the composter. Still other modifications can be made without departing from the scope of the invention as defined by the following claims.

What is claimed is:

1. A composter comprising:
   an elongated hollow drum having a substantially cylindrical wall having internal and external surfaces, said wall being symmetrical about a substantially horizontal axis of rotation, and having an interior space, said drum being mounted for rotation on said axis, and having axially spaced intake and exit ends;
   an intake end wall fixed to the cylindrical wall and extending inward toward said axis from a location adjacent a part of the cylindrical wall at the intake end of the drum, said intake end wall being rotatable with the drum and having a side facing the interior space of the drum and an intake opening for the passage of material into the interior space of the drum;
   an exit end wall fixed to the cylindrical wall and extending inward toward said axis from a location adjacent a part of the cylindrical wall at the exit end of the drum said exit end wall being rotatable with the drum and having a central exit opening for delivery of material from the interior space of the drum;
   a drive mechanism for rotating said drum about said axis;
   a first external trunnion ring on the cylindrical wall of the drum adjacent its intake end and a second external trunnion ring on the cylindrical wall of the drum adjacent its exit end, said trunnion rings being coaxial with said axis of rotation;
   first and second pairs of idler rollers rotatably supporting said drum, the first pair of rollers being in rolling engagement with the first external trunnion ring, and the second pair of rollers being in rolling engagement with the second external trunnion ring;
   in which the first external trunnion ring extends axially from a first edge of said first trunnion ring to a second edge of said first trunnion ring spaced axially from said first edge;
   in which the second external trunnion ring extends axially from a first edge of said second trunnion ring to a second edge of said second trunnion ring spaced axially from said first edge;
   in which the intake end wall is surrounded by said first external trunnion ring and located at an axial location between the axial locations of the first and second edges of the first external trunnion ring, and the exit end wall is surrounded by said second external trunnion ring and located at an axial location between the axial locations of the first and second edges of the second external trunnion ring; and including a first frusto-conical ring having large and small circular edges, the large circular edge meeting the internal surface of the cylindrical wall of the drum at a first location and the small circular edge of the first frusto-conical ring meeting the intake end wall at a location spaced radially inward toward said axis from the internal surface of the cylindrical wall of the drum;

a second frusto-conical ring having large and small circular edges, the large circular edge meeting the internal surface of the cylindrical wall of the drum at a second location and the small circular edge of the second frusto-conical ring meeting the intake end wall at a location spaced radially inward toward said axis from the internal surface of the cylindrical wall of the drum;

a third frusto-conical ring having large and small circular edges, the large circular edge meeting the internal surface of the cylindrical wall of the drum at a third location and the small circular edge of the first frusto-conical ring meeting the exit end wall at a location spaced radially inward toward said axis from the internal surface of the cylindrical wall of the drum; and a fourth frusto-conical ring having large and small circular edges, the large circular edge meeting the internal surface of the cylindrical wall of the drum at a fourth location and the small circular edge of the second frusto-conical ring meeting the exit end wall at a location spaced radially inward toward said axis from the internal surface of the cylindrical wall of the drum;

wherein said first and second locations are on opposite sides of said intake end wall, and said third and fourth locations are on opposite sides of said exit end wall.

2. The composter according to claim 1, in which said first location is opposite the first edge of the first trunnion ring, said second location is opposite the second edge of the first trunnion ring, said third location is opposite the first edge of the second trunnion ring, and said fourth location is opposite the second edge of the second trunnion ring.

3. The composter according to claim 1, including a stationary end plate having an annular marginal area all of which overlaps a part of the intake end wall, said stationary end plate having an inner surface facing the exit end of the drum, an outer surface facing away from the exit end of the drum, and a material feed opening in register with said intake opening of the intake end wall, and a feed hopper fixed to the stationary end plate on the side thereof faced by said outer surface, and including a chute arranged to deliver material collected in the hopper through said material feed opening into the interior space of the drum.

4. The composter according to claim 3, in which the annular marginal area of the stationary end plate is located on the side of the intake end wall facing the interior space of the drum.

5. The composter according to claim 3, including a seal between said annular marginal area of the stationary end plate and the part of the intake end wall overlapped by said marginal area.

6. The composter according to claim 5, in which said seal is a layer of grease in contact with both said annular marginal area and said part of the intake end wall overlapped by said marginal area.

7. The composter according to claim 1, in which the first external trunnion ring is restrained against axial movement, and in which the second external trunnion ring is axially movable relative to the second pair of rollers, thereby allowing for axial expansion and contraction of the drum.

8. The composter according to claim 1 in which said internal surface of the cylindrical wall of the drum has a coating composed of a rubber.

9. The composter according to claim 1, in which said intake end wall meets the inner surface of said cylindrical wall of the drum, said first and second frusto-conical rings cooperate with the intake end wall and the cylindrical wall of the drum to form two closed annular chambers on opposite sides of the intake end wall; in which said exit end wall also meets the inner surface of said cylindrical wall of the drum, and said third and fourth frusto-conical rings cooperate with the exit end wall and the cylindrical wall of the drum to form two closed annular chambers on opposite sides of the exit end wall; in which each of said first, second, third and fourth frusto-conical rings is provided with a through hole for delivery of corrosion-inhibiting fluid to one of said annular chambers, and each said through hole is closed by a removable plug.

10. The composter according to claim 1, in which a bevel, facing the external surface of the drum is formed in each of the first and second edges of each of the first and second trunnion rings, and said trunnion rings are connected to the external surface of the drum by welds located in part between said bevels and the external surface of the drum.

11. A composter comprising:
an elongated hollow drum having a substantially cylindrical wall having internal and external surfaces, said wall being symmetrical about a substantially horizontal axis of rotation, and having an interior space, said drum being mounted for rotation on said axis, and having axially spaced intake and exit ends;

an end wall fixed to the cylindrical wall and extending inward toward said axis from a location adjacent a part of the cylindrical wall at one of said intake and exit ends of the drum, said end wall being rotatable with the drum;

a drive mechanism for rotating said drum about said axis;

a first external trunnion ring on the cylindrical wall of the drum adjacent said one of said intake and exit ends of the drum, and a second external trunnion ring on the cylindrical wall of the drum adjacent the end of said drum opposite from said one of said intake and exit ends, said trunnion rings being coaxial with said axis of rotation;

first and second pairs of idler rollers rotatably supporting said drum, the first pair of rollers being in rolling engagement with the first external trunnion ring, and the second pair of rollers being in rolling engagement with the second external trunnion ring;

in which the first external trunnion ring extends axially from a first edge of said first trunnion ring to a second edge of said first trunnion ring spaced axially from said first edge;

in which said end wall is surrounded by said first external trunnion ring and located at an axial location between the axial locations of the first and second edges of the first external trunnion ring; and including a first frusto-conical ring having large and small circular edges, the large circular edge meeting the internal surface of the cylindrical wall of the drum at a first location, and the small circular edge of the first frusto-conical ring meeting said end wall at a location spaced radially inward toward said axis from the internal surface of the cylindrical wall of the drum; and a second frusto-conical ring having large and small circular edges, the large circular edge meeting the internal surface of the cylindrical wall of the drum at a second location, and the small circular edge of the second frusto-conical ring meeting said end wall at a location spaced radially inward toward said axis from the internal surface of the cylindrical wall of the drum.

12. The composter according to claim 11, in which said first location is opposite the first edge of the first trunnion ring, and said second location is opposite the second edge of the first trunnion ring.

13. The composter according to claim 11, in which said end wall meets the inner surface of said cylindrical wall of the drum, said first and second frusto-conical rings cooperate with said end wall and the cylindrical wall of the drum to form two closed annular chambers on opposite sides of said end wall; in which each of said first and second frusto-conical rings is provided with a through hole for delivery of corrosion-inhibiting fluid to one of said annular chambers, and each said through hole is closed by a removable plug.

14. The composter according to claim 11, in which a bevel, facing the external surface of the drum is formed in each of the first and second edges of said first trunnion ring, and said trunnion rings are connected to the external surface of the drum by welds located in part between said bevels and the external surface of the drum.

* * * * *